(12) United States Patent
Vangala et al.

(10) Patent No.: US 8,984,105 B2
(45) Date of Patent: Mar. 17, 2015

(54) FMC ARCHITECTURE FOR CDMA NETWORK

(75) Inventors: Venkata Satish Kumar Vangala, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 12/472,274

(22) Filed: May 26, 2009

(65) Prior Publication Data

US 2010/0023609 A1 Jan. 28, 2010

Related U.S. Application Data

(60) Provisional application No. 61/056,364, filed on May 27, 2008.

(51) Int. Cl.
| | | |
|---|---|---|
| *G06F 15/177* | (2006.01) | |
| *G06F 15/16* | (2006.01) | |
| *G06F 15/173* | (2006.01) | |
| *H04W 12/06* | (2009.01) | |
| *H04L 29/06* | (2006.01) | |
| *H04W 88/02* | (2009.01) | |

(52) U.S. Cl.
CPC .............. *H04W 12/06* (2013.01); *H04W 88/02* (2013.01); *H04L 65/1006* (2013.01); *H04L 65/104* (2013.01)
USPC ........... 709/221; 709/220; 709/222; 709/227; 709/228; 709/229; 709/230; 709/231; 709/238; 709/239; 709/245; 709/249; 709/250

(58) Field of Classification Search
USPC ......... 709/227–229, 230–231, 238–239, 245, 709/249, 250
See application file for complete search history.

(56) References Cited

U.S. PATENT DOCUMENTS

| | | | |
|---|---|---|---|
| 7,162,236 B2 | 1/2007 | Dorenbosch et al. | |
| 7,254,119 B2 | 8/2007 | Jiang et al. | |
| 7,330,453 B1 * | 2/2008 | Borella et al. ................. | 370/338 |
| 8,116,252 B2 | 2/2012 | Balasubramanian et al. | |
| 8,121,037 B2 | 2/2012 | Balasubramanian et al. | |

(Continued)

FOREIGN PATENT DOCUMENTS

| | | |
|---|---|---|
| CN | 101019451 A | 8/2007 |
| CN | 101106508 A | 1/2008 |

(Continued)

OTHER PUBLICATIONS

Veltri et al., "Wireless LAN-3G Integration: Unified Mechanisms for Secure Authentication based on SIP", 2006 IEEE p. 2219-2224. (Provided by the Applicant in the IDS filed on Aug. 29, 2011 p. 2 item 017).*

(Continued)

*Primary Examiner* — Edward Kim
(74) *Attorney, Agent, or Firm* — Darren M. Simon

(57) ABSTRACT

A method and apparatus are provided for connecting a mobile device to a subscriber access network, such as 3G network over an untrusted network, such as a wireless local area network (WLAN). SIP signaling is performed to authenticate and establish a connection to the subscriber access network. A unique identifier may be assigned to the mobile device for transmitting data to and receiving data from the subscriber access network.

33 Claims, 11 Drawing Sheets

(56) References Cited

U.S. PATENT DOCUMENTS

| | | | |
|---|---|---|---|
| 2003/0134651 A1* | 7/2003 | Hsu ............................. | 455/509 |
| 2003/0145013 A1 | 7/2003 | Kovarik et al. | |
| 2003/0145064 A1* | 7/2003 | Hsu et al. ..................... | 709/219 |
| 2004/0008645 A1 | 1/2004 | Janevski et al. | |
| 2004/0042423 A1* | 3/2004 | Borella et al. ................ | 370/328 |
| 2004/0114553 A1* | 6/2004 | Jiang et al. ................... | 370/328 |
| 2004/0267874 A1 | 12/2004 | Westberg et al. | |
| 2005/0021713 A1 | 1/2005 | Dugan et al. | |
| 2006/0039538 A1* | 2/2006 | Minnis et al. ................ | 379/1.01 |
| 2006/0130136 A1* | 6/2006 | Devarapalli et al. ........... | 726/15 |
| 2007/0019643 A1* | 1/2007 | Shaheen ....................... | 370/389 |
| 2007/0243872 A1* | 10/2007 | Gallagher et al. ............. | 455/436 |
| 2007/0247395 A1 | 10/2007 | Barraclough et al. | |
| 2007/0280264 A1 | 12/2007 | Milton et al. | |
| 2008/0095070 A1* | 4/2008 | Chan et al. ................... | 370/254 |
| 2009/0037607 A1* | 2/2009 | Farinacci et al. ............ | 709/249 |
| 2010/0074172 A1 | 3/2010 | Fontaine et al. | |

FOREIGN PATENT DOCUMENTS

| | | |
|---|---|---|
| JP | 2003244204 A | 8/2003 |
| JP | 2004104450 A | 4/2004 |
| JP | 2005503087 A | 1/2005 |
| JP | 2007503756 T | 2/2007 |
| JP | 2008113227 A | 5/2008 |
| JP | 2008523732 A | 7/2008 |
| JP | 2008547274 | 12/2008 |
| TW | I288535 B | 10/2007 |
| WO | WO02076049 A1 | 9/2002 |
| WO | 03024127 A1 | 3/2003 |
| WO | WO2006109462 A1 | 10/2006 |
| WO | WO2006138408 A2 | 12/2006 |
| WO | 2007080549 A1 | 7/2007 |
| WO | WO2007086812 A1 | 8/2007 |

OTHER PUBLICATIONS

3GPP TS 43.318: "3rd Generation Partnership Project; Technical Specification Group GSM/EDGE Radio Access Network; Generic Access Network (GAN); Stage 2 (Release 8)" Internet Article, [Online] Feb. 2008, pp. 1-122, XP002552032 Retrieved from the Internet: URL:http://www.3gpp.org/ftp/Specs/archive/43_series/43.318/43318-810.zip> [retrieved on Oct. 23, 2009] section 8.4.1.6.

"3rd Generation Partnership Project; Technical Specification Group Services and System Aspects; Support of Push service (Release 5); 3GPP TR 23.875" ETSI Standards, LIS, Sophia Antipolis Cedex, France, vol. 3-SA2, No. V5.1.0, Mar. 1, 2002, pp. 1-70, XP014033551 ISSN: 0000-0001 sections: 7.3.5.1, 7.6.1, 7.6.2.

Alcatel-Lucent: "Alignment of layout of access technology specific annexes" 3GPP Draft; C1-070864-Align, 3RD Generation Partnership Project (3GPP), Mobile Competence Centre; 650, Route Des Lucioles; F-06921 Sophia-antipolis Cedex; France, vol, CT WG1, no. Warsaw, Poland; 20070402, Apr. 2, 2007, pp. 1-16, XP050025081 [retrieved on Apr. 2, 2007] p. 2-3; p. 8-9.

International Search Report and Written Opinion—PCT/US2009/045347, International Search Authority—European Patent Office—Oct. 27, 2009.

International Search Report and Written Opinion—PCT/US2009/045727, International Search Authority—European Patent Office—Nov. 6, 2009.

International Search Report and Written Opinion—PCT/US2009/045731, International Search Authority—European Patent Office—Nov. 30, 2009.

"Universal Mobile Telecommunications System (UMTS); 3GPP system to Wireles Local Area Network (WLAN) interworking; System description (3GPP TS 23.234 version 7.6.0 Release 7); ETSI TS 123 234" ETSI Standards, LIS, Sophia Antipolis Cedex, France, vol. 3-SA2, No. V7.6.0, Jan. 1, 2008, XP014040569 ISSN: 0000-0001 pp. 65-68.

Veltri L., et al., "Wireless LAN-3G Integration: Unified Mechanisms for Secure Authentication based on SIP" Communications, 2006. ICC '06. IEEE International Conference on, IEEE, PI, Jun. 1, 2006, pp. 2219-2224, XP031025394 ISBN: 978-1-4244-0354-7 right-hand column, line 4—p. 2223, left-hand column, line 5; figures 1-3.

GSM, Global System for Mobile Communications, ETSI TS 124 229, V6.7.0 (2005-2006), Digital cellular telecommunications system(Phase 2+), Universal Mobile Telecommunications System (UMTS); Internet Protocol (IP) multimedia call control protocol based on Session Initiation Protocol (SIP) and Session Description Protocol (SDP); Stage 3, 3GPP TS 24.229 version 6.7.0 Release 6.Technical Specification, pp. 1-297.

Taiwan Search Report—TW098117870—TIPO—May 20, 2013.

* cited by examiner

US 8,984,105 B2

FMC ARCHITECTURE FOR CDMA NETWORK

CLAIM OF PRIORITY UNDER 35 U.S.C. §119

The present Application for Patent claims priority to Provisional Application No. 61/056,364 entitled "FMC Architecture for CDMA Network" filed May 27, 2008, and assigned to the assignee hereof and hereby expressly incorporated by reference herein.

BACKGROUND

1. Field

The application relates providing access to a 3GPP2 network over a wireless connection.

2. Background

Mobile communication devices are no longer limited to simply making and receiving voice calls. Users of such devices want to access audio, video, text, and or other content from any location. Dual mode devices exist which enable a mobile device to operate using more than one type of communication network. For example, a device may be configured to use 802.11 WLAN and a 3G network.

3G networks provide subscription based access, and use a licensed spectrum to provide wireless coverage to its subscribers. 802.11 WLANs, by contrast, operate using an unlicensed spectrum, and are therefore untrusted networks. It would be desirable to provide access to the services provided by a 3G network, by connecting over an 802.11 WLAN or other IP-based network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for connecting a mobile device to a subscriber access network over an untrusted network comprises performing session initiation protocol (SIP)-based signaling to authenticate and establish a connection to the 3G network from a packet data serving node (PDSN) of the subscriber access network with each of the mobile devices via a SIP gateway (GW); performing, by the SIP GW, High-Level Data Link Control (HDLC) framing and unframing; and assigning a unique identifier to each of the mobile device for transmitting and receiving data to and from the subscriber access network.

According to some aspects, at least one processor configured to connect a mobile device to a subscriber access network over an untrusted network comprises a first module for performing session initiation protocol (SIP)-based signaling to authenticate and establish a connection to the subscriber access network from a packet data serving node (PDSN) of the subscriber access network with each of the mobile devices via a SIP gateway (GW); a second module for performing, by the SIP GW, High-Level Data Link Control (HDLC) framing and unframing; and a third module for assigning a unique identifier to the mobile device for transmitting and receiving data to and from the subscriber access network.

According to some aspects, a computer program product comprising a computer readable medium comprises a first set of codes for causing a computer to perform session initiation protocol (SIP)-based signaling to authenticate and establish a connection to the subscriber access network from a packet data serving node (PDSN) of the subscriber access network with a mobile device via a SIP gateway (GW); a second set of codes for causing the computer to perform HDLC framing and unframing; and a third set of codes for causing the computer to assign a unique identifier to the mobile device for transmitting and receiving data to and from the subscriber access network.

According to some aspects, an apparatus comprises means for performing session initiation protocol (SIP)-based signaling to authenticate and establish a connection to the subscriber access network from a packet data serving node (PDSN) of the subscriber access network with each of the mobile devices via a SIP gateway (GW); means for performing HDLC framing and unframing; and means for assigning a unique identifier to the mobile device for transmitting and receiving data to and from the subscriber access network.

According to some aspects, a method for connecting to a subscriber access network over an untrusted network comprises detecting, at a mobile device, an untrusted network connection; issuing a data connectivity request to a SIP GW associated with the 3G network using SIP-based signaling, the data connectivity request including instructions to establish a connection between the SIP GW and a PDSN of the 3G network; and receiving an IP address for communicating within the 3G network.

According to some aspects, a wireless device comprises a processor; and a session initiator operatively coupled to the processor for initiating a connection to a subscriber access network over an untrusted network by transmitting SIP-based signals to a SIP GW associated with the subscriber access network to authenticate the wireless device and to establish a connection to a PDSN of the subscriber access network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
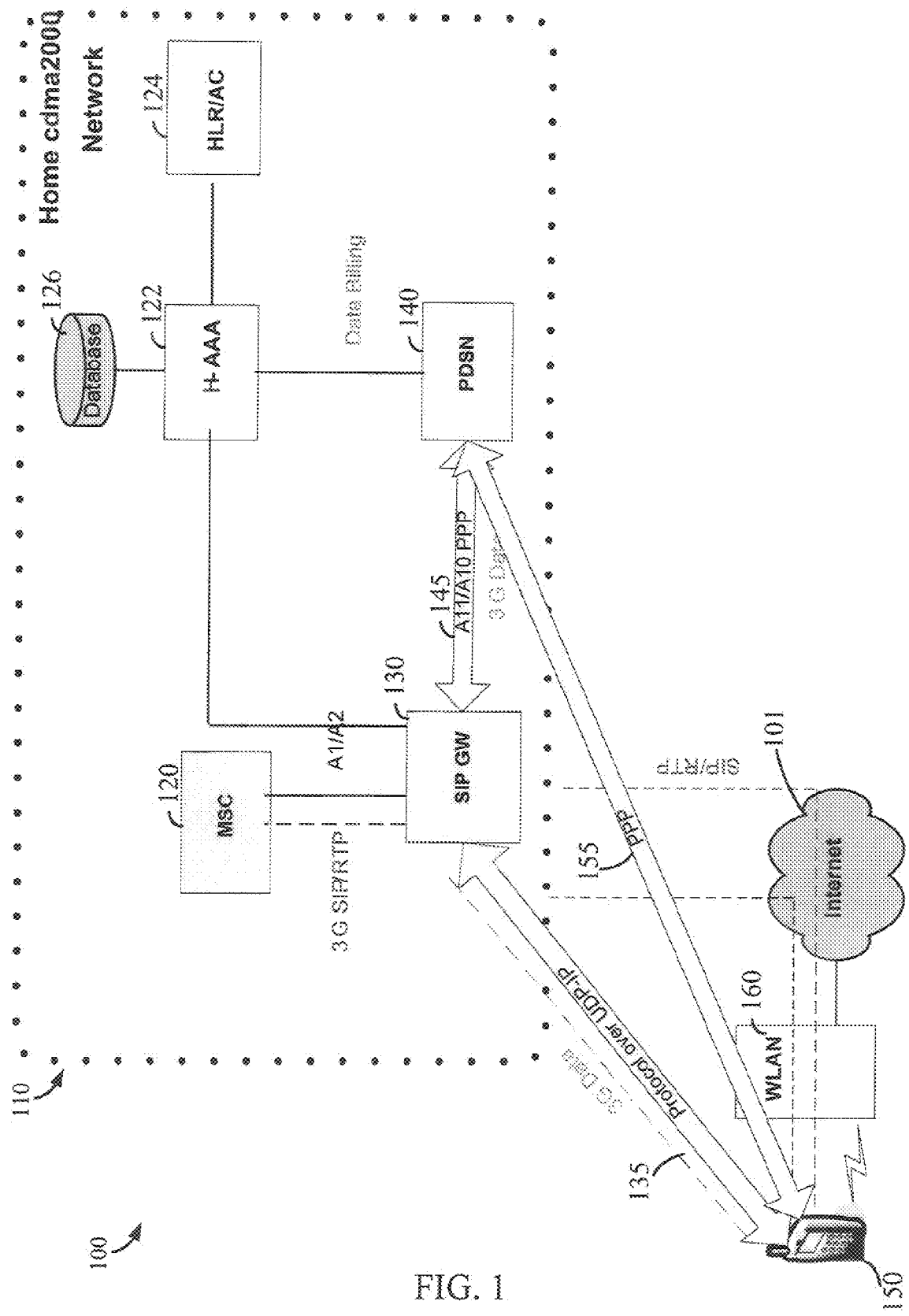
FIG. 1 depicts a communication system, in accordance with various disclosed aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 depicts a communication system 100 implementing various disclosed aspects. A subscriber access network, such as a 3G 110 comprises a packet data serving node (PDSN) 140, a mobile switching center (MSC) 120, home authentication, authorization, and accounting (H-AAA) server 122, home location register/authentication center (HLR/AC) 124, database 126, and session initiation protocol (SIP) gateway (GW) 130. A mobile station (MS) 150 may access the Internet 101 via and untrusted network, such as a wireless local area network (WLAN) access point (AP) 160 while taking advantage of the 3G backend and authentication services. WLAN AP 160 may provide IEEE 802.xx, where "xx" stands for a version number such as "11," wireless connectivity. Devices other than a mobile station may also be used such as, for example, a laptop computer. Moreover, while WLAN AP 160 is depicted and IEEE 802.xx is discussed, other connectivity protocols may be used such as, for example, WiMax, DSL, Bluetooth, infrared, and/or other connectivity protocols. 3G network 110 may be, for example, a CDMA2000 network.

PDSN 140 may be configured to provide packet data communications to the MS 150 over the WLAN AP 160 and through the 3G network 110. The PDSN 140 also interfaces with H-AAA 122 to execute functions for authentication, authorization, and accounting through the H-AAA 122. H-AAA 122 authenticates and authorizes MS 150 access to network services. MSC 120 switches traffic originating or terminating at wireless device 150. MSC 120 may provide an interface for user traffic between the wireless network and other public switched networks or other MSCs. HLR/AC 124 stores location data associated with all connected mobile stations, such as MS 150.

SIP gateway 130 enables MS 150 to access 3G network 110 services over WLAN 160, maintaining the conventional 3G backend architecture and authentication procedures. MS 150 and SIP GW 130 use SIP signaling to establish a connection between the MS 150 and the 3G network 110 over WLAN 160. Data is transferred between the MS 150 and the SIP GW 130 over the PPP over a tunnel 135. According to some aspects, tunnel 135 may be a PPP over UDP-IP tunnel. In other aspects, tunnel 135 may be a PPP over generic routing encapsulation (GRE)-UDP-IP tunnel. Other tunneling configurations may also be used. The A11/A10 link 145 is used to transmit data between SIP GW 130 and PDSN 140. Once session establishment is complete, a PPP link 155 between PDSN 140 and MS 150 may be established.

Figure 2:
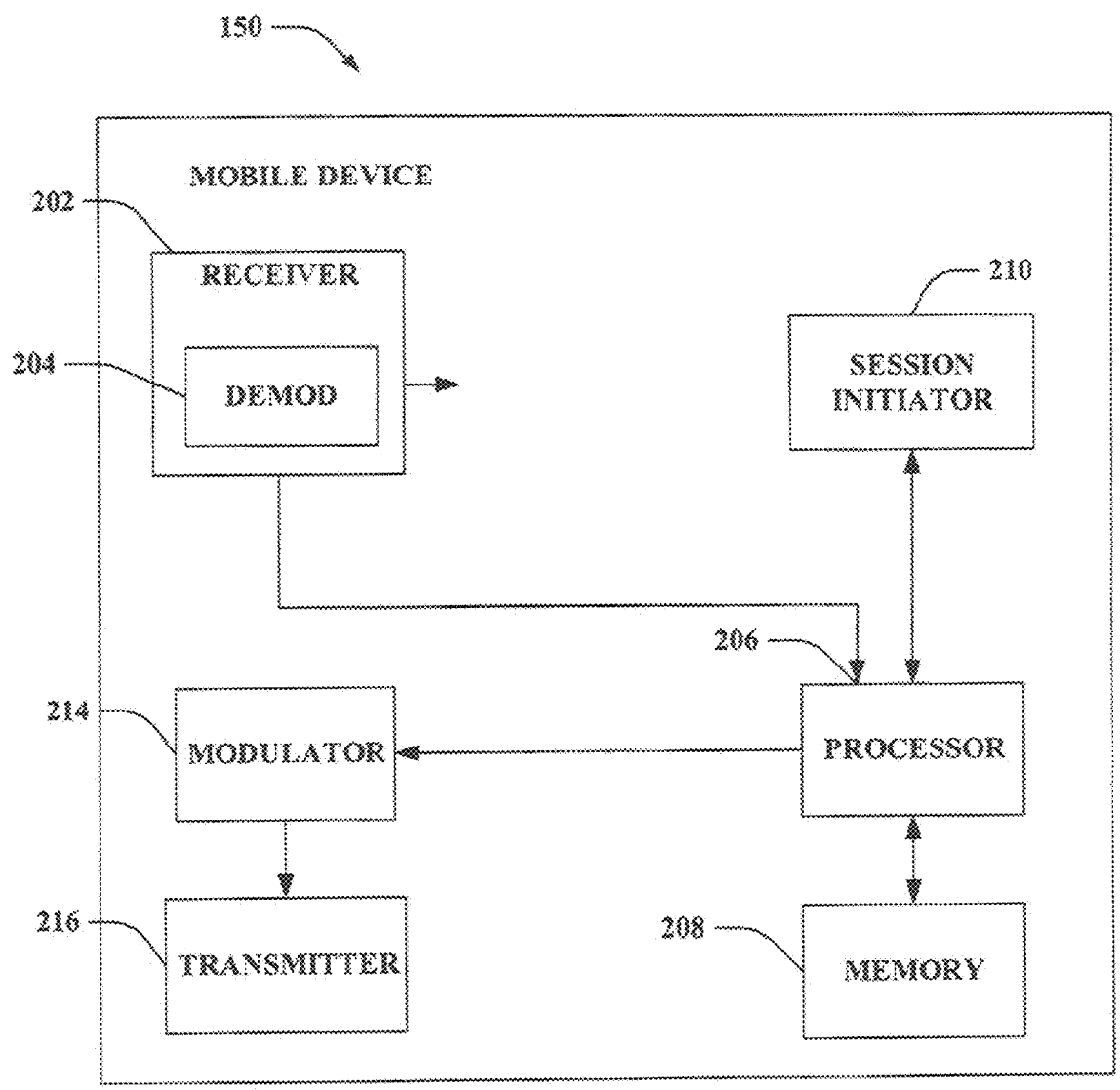
FIG. 2 depicts a mobile station, in accordance with various disclosed aspects.

FIG. 2 depicts MS 150 is greater detail. MS 150 may achieve data connectivity to 3G network 110 via WLAN or normal 3G network connectivity procedures. MS 150 may comprise a receiver 202 that receives a signal from, for example, a receive antenna (not shown), performs typical actions (e.g., filters, amplifies, downconverts, etc.) the received signal, and digitized the conditioned signal to obtain samples. MS 150 may also comprise a demodulator 204 that can demodulate received symbols and provide them to a processor 206. Processor 206 may be a processor dedicated to analyzing information received by receiver 202 and/or generating information for transmission by a transmitter 216, a processor that controls one or more components of MS 150, and/or a processor that both analyzes information received by receiver 202, generates information for transmission by transmitter 216, and controls one or more components of MS 150.

MS 150 may additionally comprise memory 208 that is operatively coupled to processor 206 and that can store data to be transmitted, received data, information related to network connectivity, and/or any other suitable information. MS 150 may additionally store protocols and/or algorithms associated with network connectivity or other functions performed by MS 150. It will be appreciated that memory 208 may be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PRROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 is intended to comprise, without being limited to, these and any other suitable types of memory.

Processor 206 may further be operatively coupled to a session initiator 210 that can facilitate a connection to the 3G network. As described herein, MS 150 may be a multi-mode device, capable of connecting to the 3G network via more than one connection procedure. For example, MS 150 may be configured to connect to the 3G network via WiFi (over WLAN 160), or using the connection mechanisms provided by the 3G network (e.g., cdma2000). Session initiator 210 may be configured to select an appropriate connection mode. According to some aspects, session initiator 210 may be configured to always connect via a WiFi connection if WiFi connectivity is detected. In other aspects, session initiator 210 may be configured to select the strongest connection, or the connection which will provide a specified quality of service level. In still other aspects, session initiator 210 may be configured to enable a user of MS 150 to select a preferred connection method on a case-by-case basis.

Session initiator 210 may also be configured to use SIP signaling to initiate a connection to the 3G network via WiFi. This may include, for example, issuing a SIP Invite to a SIP GW to request data connectivity.

Figure 3:
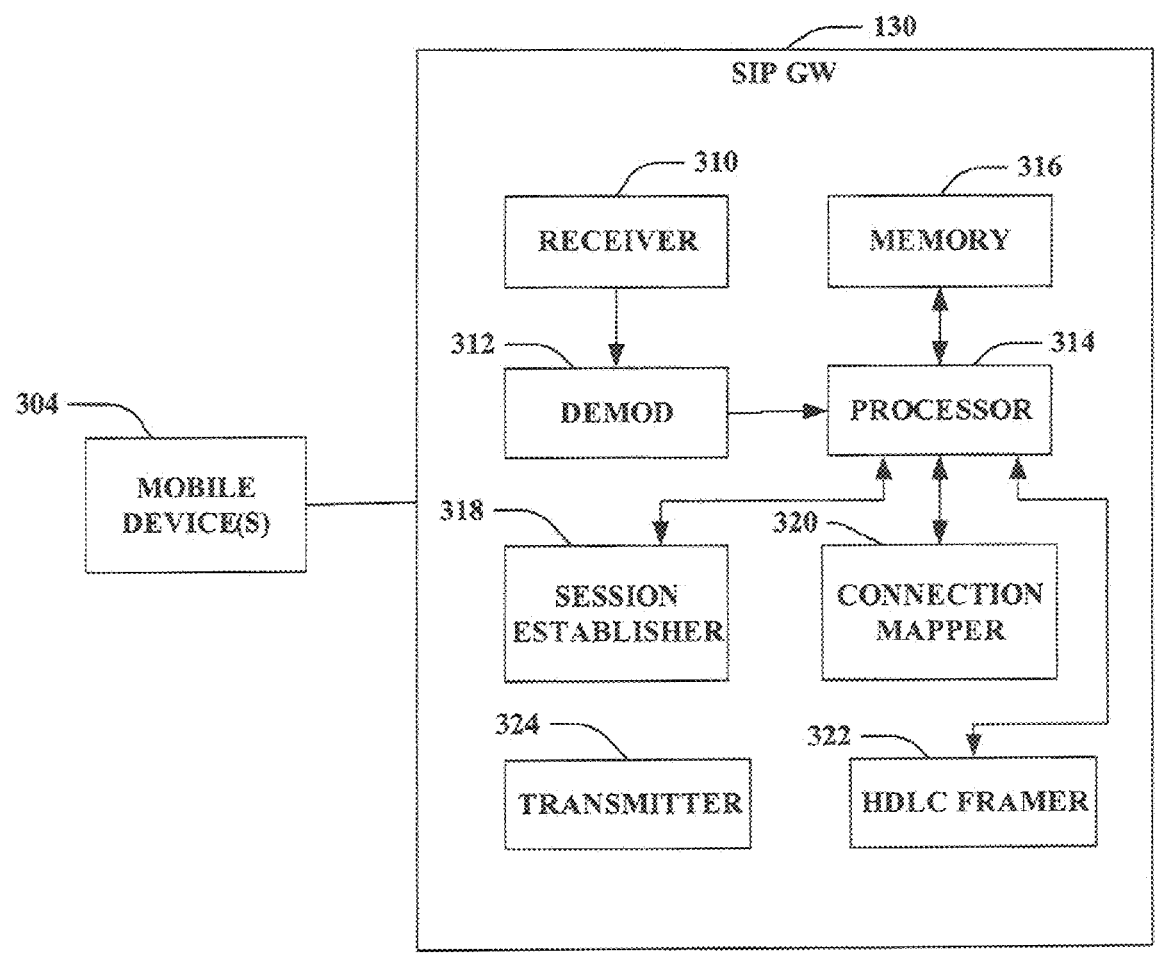
FIG. 3 depicts a SIP gateway, in accordance with various disclosed aspects.

SIP GW 130 is depicted in greater detail in FIG. 3. SIP GW 130 facilitates session establishment and authentication, as well as routing of data and control information between a mobile device and a 3G network (such as 3G network 110) over an IP-based connection, such as a WLAN. SIP GW 130 may comprise a receiver 310 that receives signals from one or more mobile devices 304 (such as MS 150) and a transmitter 324 that transmits to the one or more mobile devices 304. Receiver 310 may be operatively associated with a demodulator 312 that demodulates received information. Demodulated symbols may be analyzed by a processor 314 that may be similar to the processor described above in reference to FIG. 2, and which is coupled to a memory 316 that stores information related to session establishment and data routing as well as other suitable information. Processor 314 may be coupled to a session establisher 318 which facilitates data connectivity between the one or more mobile devices 304 and the 3G network, a connection mapper 320 that generates and maintains connectivity mapping tables, and an HDLC framer 322 for framing data to be sent to the PDSN.

Session establisher 318 may be configured to request data service connectivity to a network on behalf of the one or more mobile devices 304. This may include, for example, establishing a connection to the MSC, establishing a PPP connection to the PDSN, assigning port numbers, and assigning IP addresses. Connection mapper 320 may be configured to maintain tables which map each mobile device which has requested connectivity to a particular communications means. According to some aspects, the communications means may be a particular UDP port of the SIP GW. Thus, connection mapper 320 may assign a UDP port to each mobile device requesting connectivity, and may maintain a UDP to A10 mapping table. In other aspects, one or more UDP ports may be configured with a plurality of stream identifiers (IDs). The connection mapper 320 may be configured to assign a stream ID to each mobile device requesting connectivity, and to maintain a stream ID to A10 mapping table. Other mapping methods may also be used.

According to some aspects, SIP GW 130 may be configured to perform HDLC framing of data prior to transmitting the data to the PDSN. This alleviates some of the processing drain on the mobile device. HDLC framer 322 may be configured to perform HDLC framing.

Figure 4A:
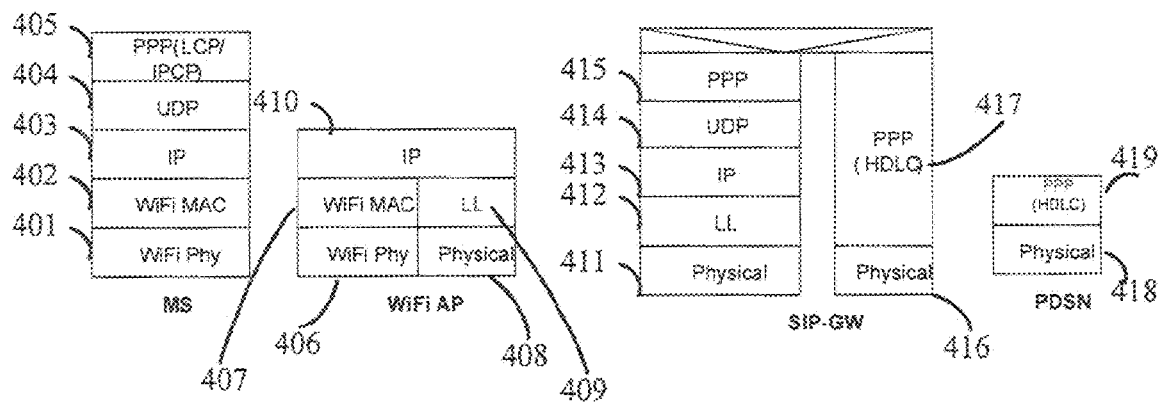
FIGS. 4A and 4B depict protocol stack configurations of a PPP approach, in accordance with various disclose aspects.
Figure 4B:
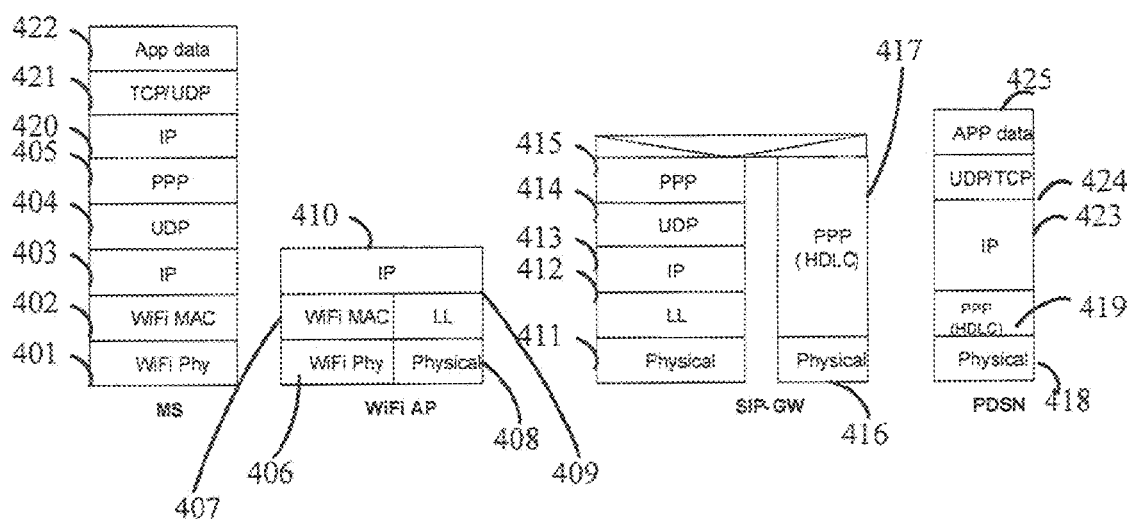

FIGS. 4A and 4B depict protocol stack configurations of a PPP approach wherein the tunnel 135 (depicted in FIG. 1) is a PPP over UDP-IP tunnel. In accordance with this approach, the SIP GW 130, via the connection mapper 320, generates and maintains a UDP to A10 mapping table. FIG. 4A depicts a control plane protocol stack while FIG. 4B depicts a data plane protocol stack. In the control plane protocol stack shown in FIG. 4A, MS 150 includes a WiFi Physical layer 401, a WiFi medium access control (MAC) layer 402, an IP layer 403, a UDP layer 404, and a PPP layer 405. WiFi AP 160 includes, on the mobile facing side, a WiFi Physical layer 406 and a Wifi MAC layer 407. On the SIP GW facing side, the WiFi AP 160 includes a Physical layer 408 and a logical link (LL) layer 409. An IP layer 410 is also included.

The SIP GW 130 includes a physical layer 411, an LL layer 412, an IP layer 413, an UDP layer 414, and a PPP layer 415 on the mobile facing side. On the PDSN facing side, the SIP GW 130 includes a physical layer 416 and a PPP layer 417. PDSN 140 includes a physical layer 418 and a PPP layer 419.

In the data plane protocol stack shown in FIG. 4B, MS 150 includes a WiFi Physical layer 401, a WiFi medium access control (MAC) layer 402, an IP layer 403, a UDP layer 404, a PPP layer 405, and IP layer 420, a TCP/UDP layer 421, and an application layer 422. The WiFi AP 160 includes, on the mobile facing side, a WiFi Physical layer 406 and a Wifi MAC layer 407. On the SIP GW facing side, the WiFi AP 160 includes a Physical layer 408 and a logical link (LL) layer 409. An IP layer 410 is also included.

The SIP GW 130 includes a physical layer 411, an LL layer 412, an IP layer 413, an UDP layer 414, and a PPP layer 415 on the mobile facing side. On the PDSN facing side, the SIP GW 130 includes a physical layer 416 and a PPP layer 417. PDSN 140 includes a physical layer 418, a PPP layer 419, an IP layer 423, a UDP/TCP layer 424, and a application data layer 425.

In operation, when data is transmitted from MS 150 to the WiFi AP 160, a global IP address used to access the 3G network is encapsulated in the data frame, and a local IP address is used to communicate with the SIP GW.

Once a data frame reaches the SIP GW, the SIP GW examines the headers to determine the global IP address, and reformats the frame for sending over the PPP connection to the PDSN. As UDP is a datagram protocol, data from the MS to the SIP GW via the WLAN need not be framed. However, the PDSN expects to receive framed data. According to some aspects, the SIP GW may be configured to perform HDLC framing on a data frame prior to forwarding the data over the A10 link to the PDSN.

Figure 5:
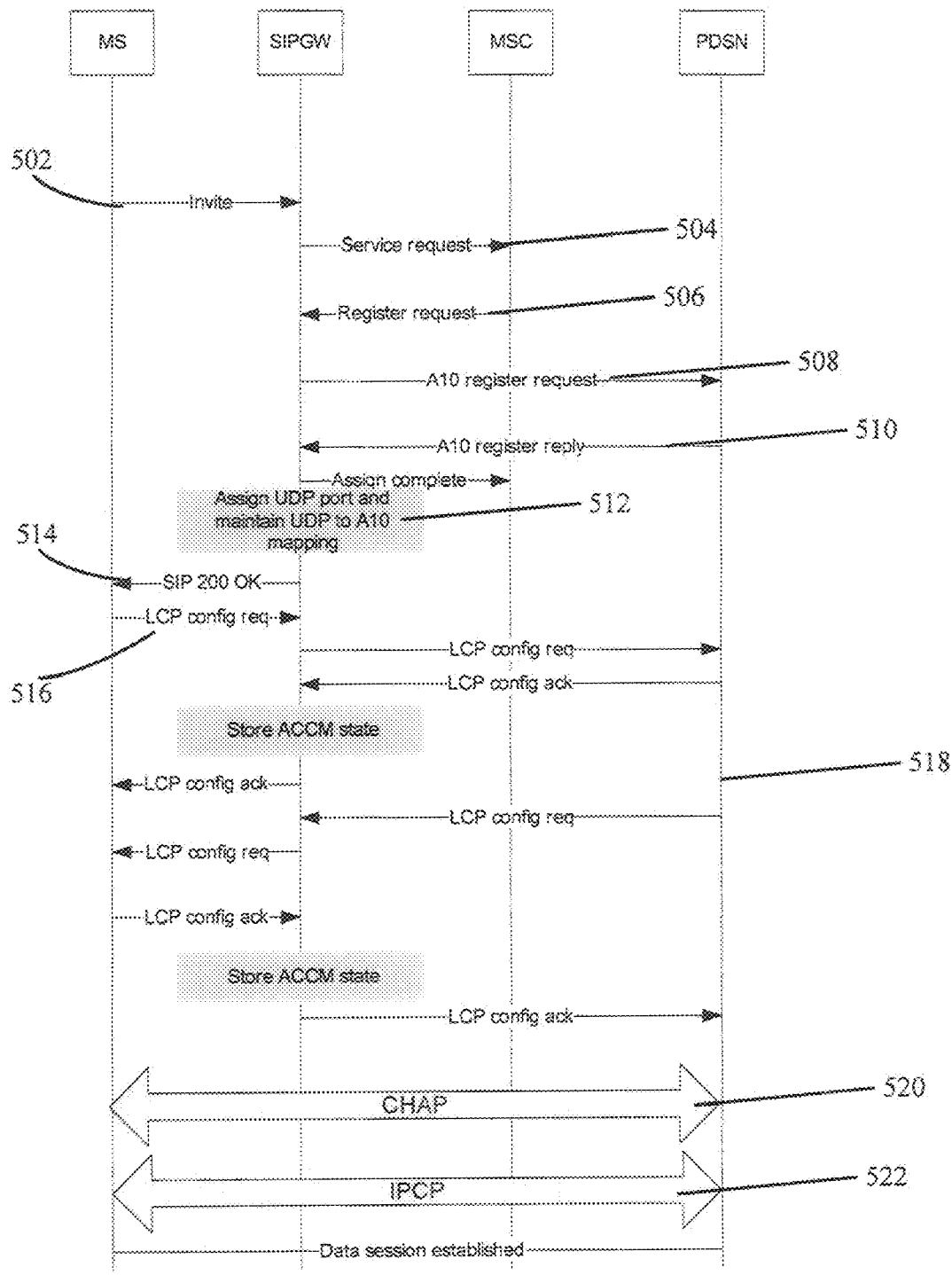
FIG. 5 is a call flow diagram depicting a session establishment procedure, in accordance with various disclosed aspects.

FIG. 5 is a call flow diagram depicting a session establishment procedure for the PPP approach depicted in FIGS. 4A and 4B, in accordance with some aspects. Call flows between MS 150, SIP GW 130, MSC 120, and PDSN 140 are shown. When the MS 150 wants to establish data connectivity, the MS 150 sends an Invite message to SIP GW 130, as depicted at 502. The Invite message is transmitted using SIP. Upon receipt of the SIP Invite, SIP GW 130 transmits a service request to MSC 120, as depicted at 504, and receives a reply, as depicted at 506. The SIP GW 130 then creates a connection to the PDSN 140.

As depicted at 508, the SIP GW 130 sends an A10 register request to the PDSN 140, and receives a reply, as depicted at 510. The SIP GW 140 may have associated therewith a plurality of UDP ports. According to some aspects, each connected MS, such as MS 150, is assigned a particular UDP port, as depicted at 512. The UDP port may be used to access the SIP GW when sending PPP messages. The SIP GW 130 may maintain a UDP-to-A10 mapping table which may be used by SIP GW 130 to determine how to reach each connected MS. The mapping table may be additionally used to forward data coming from the MS to the appropriate A10 connection to the PDSN. The SIP GW 130 sends a "SIP 200 OK" message to the MS 150 once the SIP-based authentication procedures are complete, as depicted at 514.

The UDP port assigned in step 512 may now be used to transmit PPP messages between the MS 150, SIP GW 130, and PDSN 140. The PPP messages may be encapsulated in a UDP-IP header which the SIP GW removes prior to forwarding data over the A10 link. As depicted at 516, the MS sends an LCP configuration request message to the SIP GW. The LCP configuration request is a PPP packet for establishing a PPP session. The LCP configuration continues, as depicted at 518, followed by CHAP procedures 520 and IPCP procedures 522. The WLAN AP 160 assigns a first IP address to the MS 150 when the MS first connects. This first IP address allows access to the SIP GW and any entities located outside of the 3G network. During the IPCP procedures depicted at 522, a second IP address is assigned to the MS 150 for addressing within the 3G network.

According to some aspects, rather than assigning a UDP port to each connected mobile device one or more UDP ports may have multiple streams associated therewith. Thus, the SIP GW can support the connection of more mobile stations. In accordance with these aspects, the tunnel 135 depicted in FIG. 1 may be a PPP over GRE/UDP/IP tunnel. The GRE tunnel enables the insertion of an additional header for the stream ID.

Figure 6A:
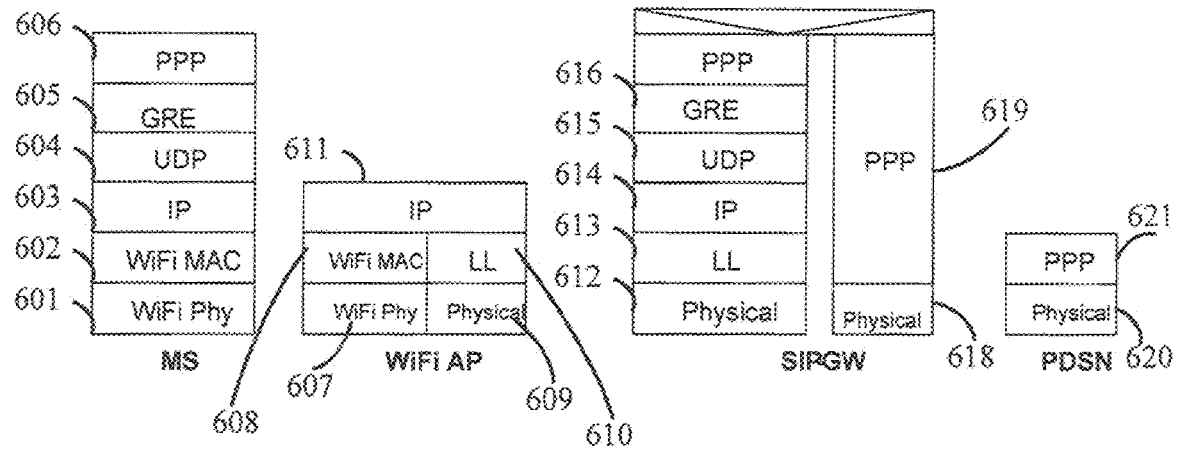
FIGS. 6A and 6B depict protocol stack configurations for a stream ID mapping approach, in accordance with various disclosed aspects.
Figure 6B:
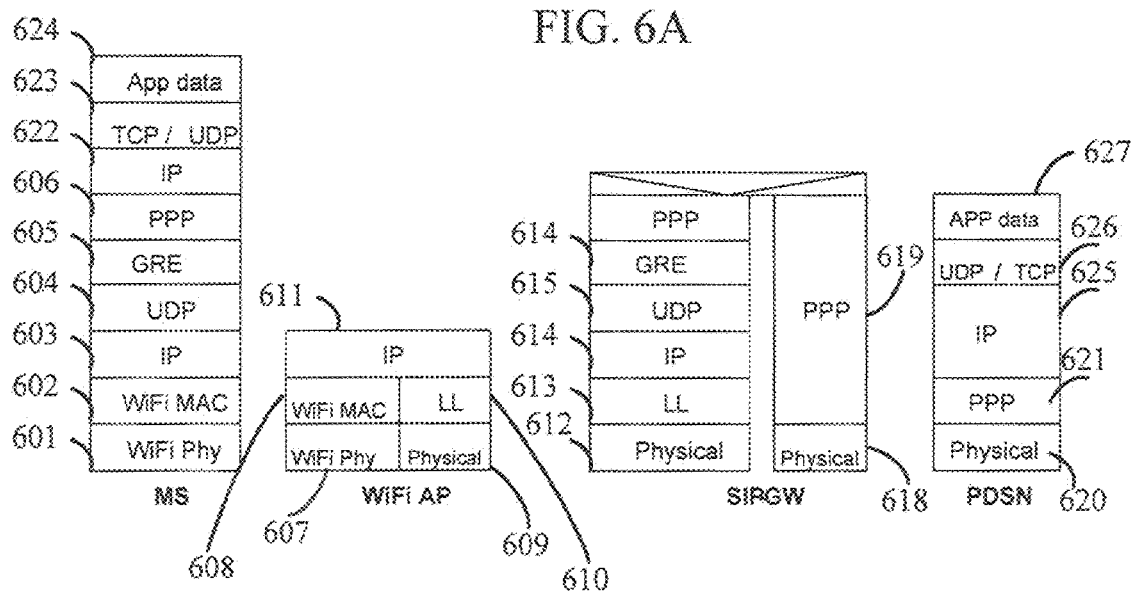

FIGS. 6A and 6B depict protocol stack configurations for the stream ID mapping approach. FIG. 6A depicts a control plane protocol stack while FIG. 6B depicts a data plane protocol stack. In the control plane protocol stack shown in FIG. 6A, MS 150 includes a WiFi Physical layer 601, a WiFi medium MAC layer 602, an IP layer 603, a UDP layer 604, a GRE layer 605, and a PPP layer 606. WiFi AP 160 includes, on the mobile facing side, a WiFi Physical layer 607 and a Wifi MAC layer 608. On the SIP GW facing side, the WiFi AP 160 includes a Physical layer 609 and a logical link (LL) layer 610. An IP layer 611 is also included.

The SIP GW 130 includes a physical layer 612, an LL layer 613, an IP layer 614, an UDP layer 615, a GRE layer 616, and a PPP layer 617 on the mobile facing side. On the PDSN facing side, the SIP GW 130 includes a physical layer 618 and a PPP layer 619. PDSN 140 includes a physical layer 620 and a PPP layer 621.

In the data plane protocol stack shown in FIG. 6B, MS 150 includes a WiFi Physical layer 601, a WiFi medium access control (MAC) layer 602, an IP layer 603, a UDP layer 604, a GRE layer 605, a PPP layer 606, an IP layer 622, a TCP/UDP layer 623, and an application data layer 624. WiFi AP 160 includes, on the mobile facing side, a WiFi Physical layer 607 and a Wifi MAC layer 608. On the SIP GW facing side, the WiFi AP 160 includes a Physical layer 609 and a logical link (LL) layer 610. An IP layer 611 is also included.

The SIP GW 130 includes a physical layer 612, an LL layer 613, an IP layer 614, an UDP layer 615, a GRE layer 616, and a PPP layer 617 on the mobile facing side. On the PDSN facing side, the SIP GW 130 includes a physical layer 618 and a PPP layer 619. PDSN 140 includes a physical layer 620, a PPP layer 621, an IP layer 625, a UDP/TCP layer 626, and an application data layer 627.

Similar to the PPP approach depicted in FIGS. 4A and 4B, the SIP GW 130 again performs HDLC framing prior to transmitting data to the PDSN. GRE layers 605, 616 may include a stream ID.

Figure 7:
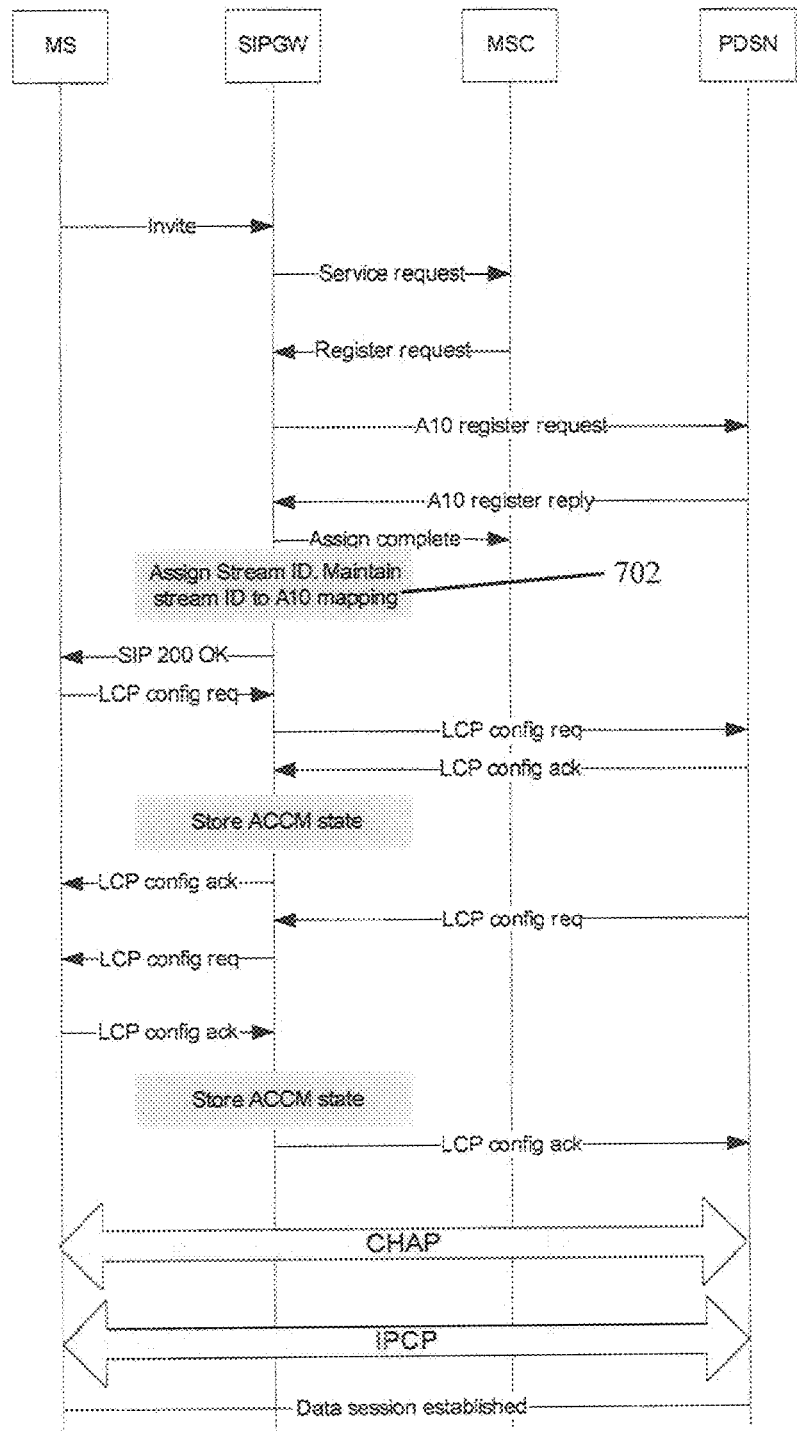
FIG. 7 depicts a call flow diagram depicting a session establish procedure, in accordance with various disclosed aspects.

FIG. 7 is a call flow diagram depicting the PPP stream ID approach. The invitation and registration steps, as well as the LCP configuration, CHAP, and IPCP procedures are the same as those depicted in FIG. 5. As such, these steps are not described again in relation to FIG. 7. As depicted at 702, the SIP GW assigns a stream ID to each connected mobile station. The SIP GW may be configured to maintain a stream ID-to-A10 mapping. Thus, data transferred to/from the SIP GW from/to the MS is based on the stream ID, rather than the UDP port number.

Figure 8:
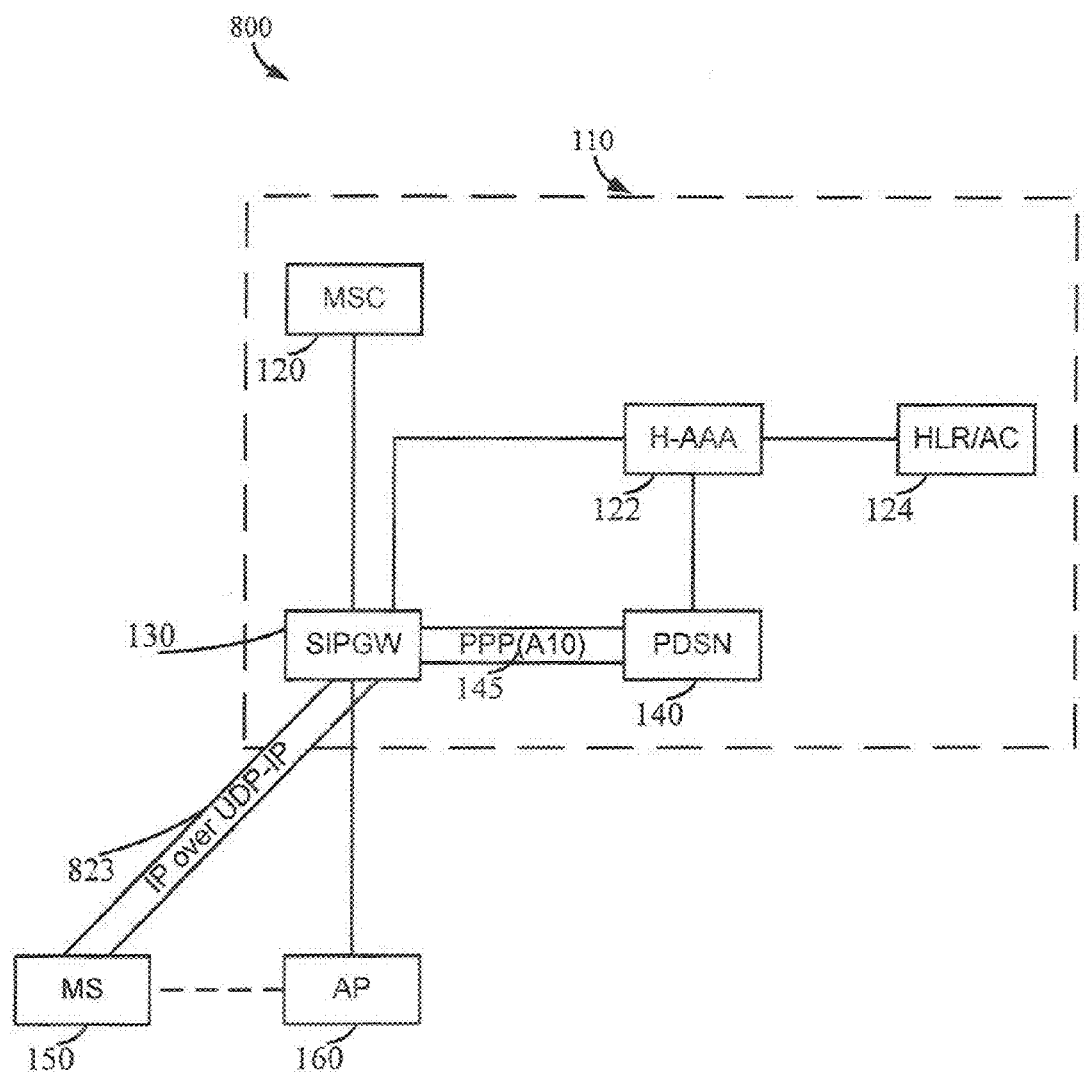
FIG. 8 depicts a communication system, in accordance with various disclosed aspects

According to some aspects, a PPP connection between a MS and a PDSN may be eliminated while still allowing the MS to access the 3G network over WLAN. FIG. 8 depicts a communication system 800 in accordance with these aspects. An IP over UDP/IP link 823 is provided between SIP GW 130 and MS 150. All PPP processing is done at the SIP GW. The MS 150 communicates with the SIPGW using IP messages. The SIP GW performs PPP processing on behalf of the MS. According to some aspects, IP address negotiation is performed using DHCP. In other aspects, SIP-based IP negotiation may be performed.

Figure 9A:
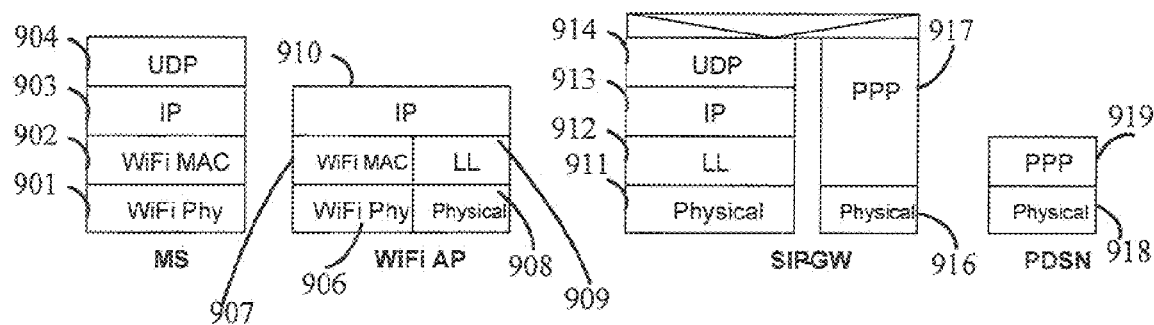
FIGS. 9A and 9B depict protocol stack configurations for a PPP elimination approach, in accordance with various disclosed aspects.
Figure 9B:
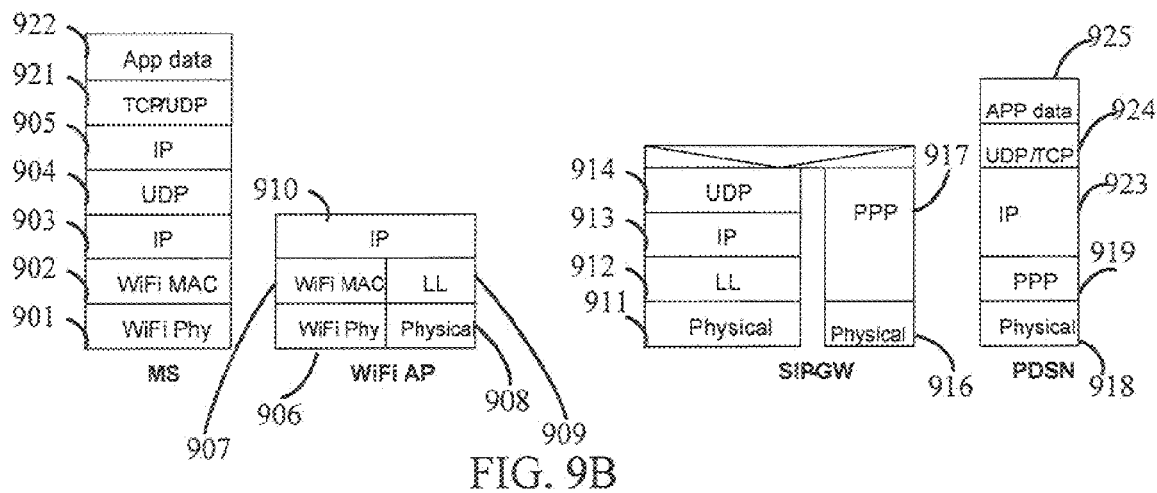

FIGS. 9A and 9B depict protocol stack configurations for the PPP elimination approach. FIG. 9A depicts a control plane protocol stack while FIG. 9B depicts a data plane protocol stack. In the control plane protocol stack shown in FIG. 9A, MS 150 includes a WiFi physical layer 901, a WiFi MAC layer 902, an IP layer 903, and a UDP layer 904. WiFi AP 160 includes, on the mobile facing side, a WiFi Physical layer 906 and a Wifi MAC layer 907. On the SIP GW facing side, the WiFi AP 160 includes a Physical layer 908 and a logical link (LL) layer 909. An IP layer 910 is also included.

The SIP GW 130 includes a physical layer 911, an LL layer 912, an IP layer 913, and an UDP layer 914 on the mobile facing side. On the PDSN facing side, the SIP GW 130 includes a physical layer 916 and a PPP layer 917. PDSN 140 includes a physical layer 918 and a PPP layer 919.

In the data plane protocol stack shown in FIG. 9B, MS 150 includes a WiFi Physical layer 901, a WiFi medium access control (MAC) layer 902, an IP layer 903, a UDP layer 904, an IP encapsulation layer 905, a TCP/UDP layer 921, and an application data layer 922. WiFi AP 160 includes, on the mobile facing side, a WiFi Physical layer 906 and a Wifi MAC layer 907. On the SIP GW facing side, the WiFi AP 160 includes a Physical layer 908 and a logical link (LL) layer 909. An IP layer 910 is also included.

The SIP GW 130 includes a physical layer 911, an LL layer 912, an IP layer 913, and an UDP layer 914 on the mobile facing side. On the PDSN facing side, the SIP GW 130 includes a physical layer 916 and a PPP layer 917. PDSN 140 includes a physical layer 918, a PPP layer 919, an IP layer 923, a UDP/TCP layer 924, and an application data layer 925.

Figure 10:
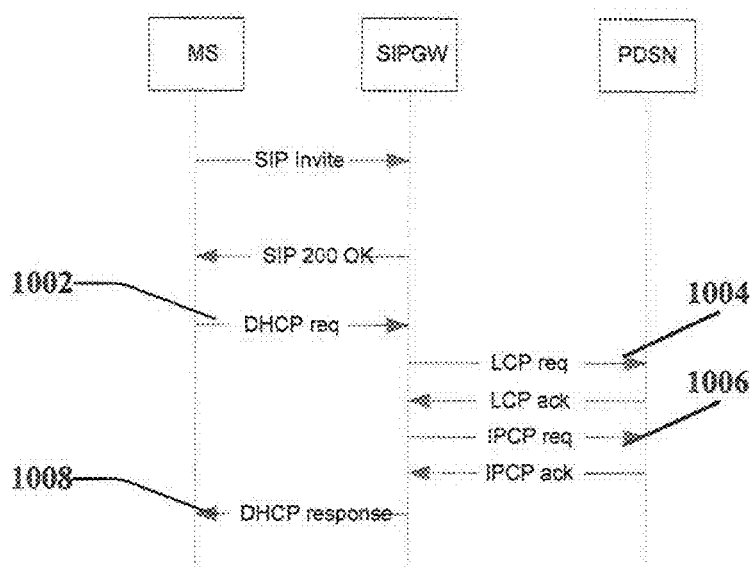
FIG. 10 depicts a call flow diagram depicting a session establish procedure, in accordance various disclosed aspects.

FIG. 10 is a call flow diagram depicting the PPP elimination approach, in accordance with some aspects. The invitation and registration steps are the same as those depicted in FIG. 5. As such, no further description of these steps is provided. As depicted at 1002, after the SIP access authentication procedures are complete, the MS may issue a DHCP request to the SIP GW to request an IP address. The SIP GW then issues LCP and IPCP requests on behalf of the SIP GW, as depicted at 1004 and 1006, respectively. Upon completion, the SIP GW responds to the DHCP request, as depicted at 1008, providing an IP address to the MS.

According to some aspects, SIP signaling may be used to request an IP address rather than DHCP. In accordance with these aspects, following the SIP Invite, the SIP GW may perform the LCP and IPCP procedures. The obtained IP address may be forwarded to the MS with the SIP 200OK message. The SIP GW may be configured to add or remove PPP headers when sending or receiving IP packets to or from the MS. That is, when the SIP GW receives an IP packet from the MS, it may add PPP headers to forward the packet to the PDSN. Conversely, when sending packets to the MS, the SIP GW may be configured to remove PPP headers. According to some aspect, the SIP GW may be configured to perform HDLC framing, thereby reducing the amount of processing performed by the MS.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
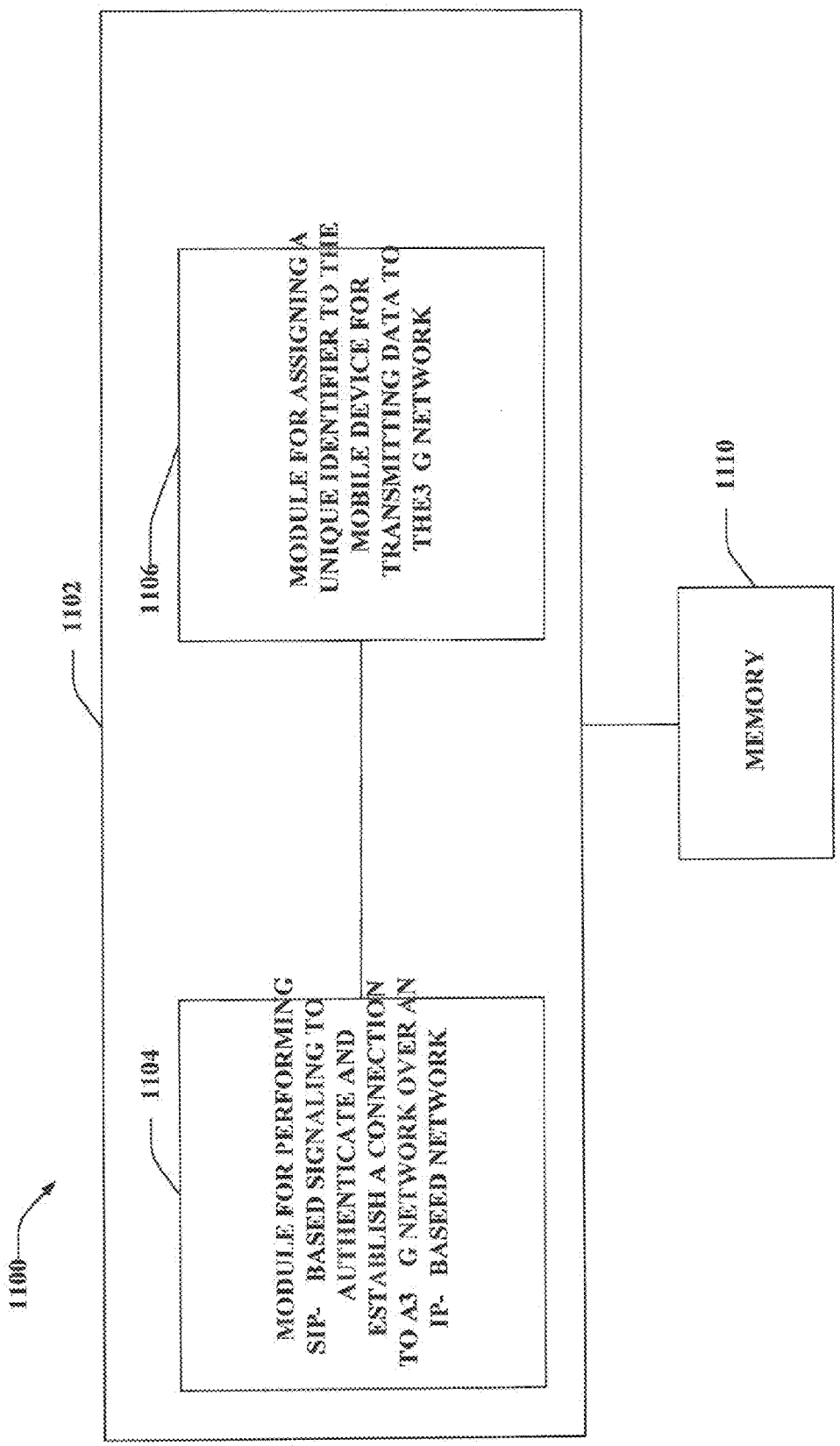
FIG. 11 depicts a system for enabling data connectivity, in accordance with various disclosed aspects.

Turning to FIG. 11, illustrated is a system 1100 that receives requests from one or more mobile devices for data connectivity to a 3G network over a WLAN. System 1100 can reside within a SIP GW, for example. As depicted, system 1100 includes functional blocks that can represent functions implemented by a processor, software, or combination thereof (e.g., firmware). System 1100 includes a logical grouping 1102 of electrical components that act in conjunction. Logical grouping 1102 can include a module for performing SIP-based signaling to authenticate and establish a connection to a 3G network over an IP-based network 1104. Moreover, logical grouping 1102 can include a module for assigning a unique identifier to the mobile device for transmitting data to the 3G network 1106. Additionally, system 1100 can include a memory 1110 that retains instructions for executing functions associated with electrical components 1104 and 1106. While shown as being external to memory 1110, it is to be understood that electrical components 1104 and 1106 can exist within memory 1110.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for connecting one or more mobile devices to a subscriber access network over an untrusted network, comprising:
    performing, by a session initiation protocol (SIP) gateway (GW), SIP-based signaling to authenticate and establish a point-to-point protocol (PPP) connection to the subscriber access network from a packet data serving node (PDSN) of the subscriber access network with each of the one or more mobile devices, wherein performing the SIP-based signaling further comprises establishing an A10 link between the SIP GW and the PDSN to perform access authentication;
    performing, by the SIP GW, High-Level Data Link Control (HDLC) framing and unframing;
    assigning a unique identifier to each of the one or more mobile devices for transmitting and receiving data to and from the subscriber access network over the untrusted network; maintaining an A10 mapping table of the unique identifier to an appropriate A10 link; and
    utilizing, by the SIP GW, the A10 mapping to connect to each of the one or more mobile devices and to forward data coming from each of the one or more mobile devices over the untrusted network to the PDSN via the appropriate A10 link.

2. The method of claim 1, wherein the access authentication is performed using PPP.

3. The method of claim 1, further comprising:
    adding, by the SIP GW, a PPP header to an IP packet received from at least one of the one or more mobile devices; and
    removing, by the SIP GW, a PPP header from a packet prior to sending the packet to the at least one mobile device.

4. The method of claim 1, wherein the unique identifier comprises a UDP port number.

5. The method of claim 1, wherein the unique identifier comprises a stream ID.

6. The method of claim 4, further comprising:
    assigning an IP address to at least one of the one or more mobile devices for communicating within the subscriber access network.

7. The method of claim 1, wherein performing SIP-based signaling comprises receiving communication from at least one of the one or more mobile devices and establishing the PPP connection between the SIP GW and the PDSN.

8. The method of claim 7, wherein establishing the PPP connection further comprises assigning an IP address for addressing within the subscriber access network, and wherein communication from the at least one mobile device is received via an IP over UDP-IP tunnel using the unique identifier.

9. The method of claim 7, and wherein communication from the at least one mobile device is received via a UDP-IP tunnel using the unique identifier.

10. The method of claim 7, wherein the IP address is assigned in response to a DHCP request from the at least one mobile device.

11. The method of claim 1, wherein authentication and session establishment comprises:
    receiving a SIP invite indicating that at least one of the one or more mobile devices requires data connectivity; and
    establishing, using SIP signaling, a connection to the PDSN.

12. The method of claim 1, wherein the subscriber access network comprises a CDMA2000 network.

13. The method of claim 1, wherein the untrusted network comprises at least one of an 802.xx wireless network, a Bluetooth network, an infrared network, a WiMax network, and a xDSL network.

14. An apparatus for connecting one or more mobile devices to a subscriber access network over an untrusted network, comprising:
    a session establisher configured to perform session initiation protocol (SIP)-based signaling to authenticate and establish a point-to-point protocol (PPP) connection to the subscriber access network from a packet data serving node (PDSN) of the subscriber access network with each of the mobile devices, wherein performing the SIP-based signaling further comprises establishing an A10 link between the SIP GW and the PDSN to perform access authentication;
    a High-Level Data Link Control (HDLC) framer, at the SIP GW, configured to perform HDLC framing and unframing;

a connection mapper configured to assign a unique identifier to each of the one or more mobile devices for transmitting and receiving data to and from the subscriber access network over the untrusted network;

an A10 mapping table that maps the unique identifier to an appropriate A10 link; and a transmitter configured to utilize the A10 mapping table to connect to each of the mobile devices and to forward data coming from each of the mobile devices over the untrusted network to the PDSN via the appropriate A10 link.

15. A computer program product configured to connect one or more mobile devices to a subscriber access network over an untrusted network, comprising:

a non-transitory computer-readable medium comprising:

a first set of codes for causing a computer to perform session initiation protocol (SIP)-based signaling to authenticate and establish a point-to-point protocol (PPP) connection to the subscriber access network from a packet data serving node (PDSN) of the subscriber access network with each of the mobile devices, wherein performing the SIP-based signaling further comprises establishing an A10 link between the SIP GW and the PDSN to perform access authentication;

a second set of codes for causing the computer to performing High-Level Data Link Control (HDLC) framing and unframing;

a third set of codes for causing the computer to assign a unique identifier to each of the one or more mobile devices for transmitting and receiving data to and from the subscriber access network over the untrusted network;

a fourth set of codes for causing the computer to maintain an A10 mapping table of the unique identifier to an appropriate A10 link; and a fifth set of codes for causing the computer to utilize the A10 mapping table to connect to each of the mobile devices and to forward data coming from each of the mobile devices over the untrusted network to the PDSN via the appropriate A10 link.

16. An apparatus configured to connect one or more mobile devices to a subscriber access network over an untrusted network, comprising:

means for performing session initiation protocol (SIP)-based signaling to authenticate and establish a point-to-point protocol (PPP) connection to the subscriber access network from a packet data serving node (PDSN) of the subscriber access network with each of the mobile devices, wherein performing the SIP-based signaling further comprises establishing an A10 link between the SIP GW and the PDSN to perform access authentication;

means for performing, by the SIP GW, High-Level Data Link Control (HDLC) framing and unframing;

means for assigning a unique identifier to each of the one or more mobile devices for transmitting and receiving data to and from the subscriber access network over the untrusted network and for maintaining an A10 mapping table of the unique identifier to an appropriate A10 link; and means for utilizing, by the SIP GW, the A10 mapping table to connect to each of the mobile devices and to forward data coming from each of the mobile devices over the untrusted network to the PDSN via the appropriate A10 link.

17. An apparatus, comprising:

a processor configured to perform SIP-based signaling to authenticate and establish a connection to a subscriber access network over an untrusted network from a PDSN of the subscriber access network to a mobile device, to establish an A10 link between the SIP GW and the PDSN to perform access authentication, to assign a unique identifier to the mobile device for transmitting and receiving data to and from the subscriber access network over the untrusted network, to perform High-Level Data Link Control (HDLC) framing and unframing, to maintain an A10 mapping table of the unique identifier to an appropriate A10 link, to utilize the A10 mapping table to connect to the mobile device and to forward data coming from the mobile device over the untrusted network to the PDSN via the appropriate A10 link, and to establish a point-to-point protocol (PPP) link between the PDSN and the mobile device; and a memory coupled to the processor for storing data.

18. The apparatus of claim 17, wherein performing the SIP-based signaling further comprises establishing the A10 link to the PDSN to perform access authentication.

19. The apparatus of claim 18, wherein the access authentication is performed using PPP.

20. The apparatus of claim 18, wherein the processor is further configured to add a PPP header to an IP packet received from a the mobile device and to remove a PPP header from a packet prior to sending the packet to the mobile device.

21. The apparatus of claim 17, wherein the unique identifier comprises a UDP port number.

22. The apparatus of claim 17, wherein the unique identifier comprises a stream ID.

23. The apparatus of claim 21, wherein the processor is further configured to assign an IP address to the mobile device for communicating within the subscriber access network.

24. The apparatus of claim 17, wherein the processor is configured to receive communication from the mobile device and establish the PPP connection to the PDSN.

25. The apparatus of claim 17, wherein the unique identifier comprises an IP address for addressing within the subscriber access network, and communication from the mobile device is received via an IP over UDP-IP tunnel.

26. The apparatus of claim 25, wherein the communication from the mobile device is received via a UDP-IP tunnel.

27. The apparatus of claim 25, wherein the IP address is assigned in response to a DHCP request from the mobile device.

28. The apparatus of claim 17, wherein the processor is further configured to:

receive a SIP invite indicating that the mobile device requires data connectivity; and establish, using SIP signaling, a connection to the PDSN associated with the subscriber access network.

29. The apparatus of claim 17, wherein the subscriber access network is a CDMA2000 network.

30. The apparatus of claim 17, wherein the untrusted network comprises at least one of an 802.xx wireless network, a Bluetooth network, an infrared network, a WiMax network, and a xDSL network.

31. A method for connecting to a subscriber access network over an untrusted network, comprising:

detecting, at a mobile device, an untrusted network connection;

issuing a data connectivity request to a SIP GW associated with the subscriber access network using SIP-based signaling, the data connectivity request including instructions to establish a point-to-point protocol (PPP) connection between the mobile device and a PDSN of the subscriber access network;

receiving an IP address for communicating within the subscriber access network;

receiving a unique identifier for transmitting messages to and receiving messages from the SIP GW over the untrusted network, wherein the unique identifier is based on an A10 mapping table that maps the unique identifier to an appropriate A10 link; and transmitting a message encapsulating the IP address using the unique identifier.

32. The method of claim 31, further wherein:

receiving a unique identifier comprises receiving a UDP port assignment for transmitting messages to and receiving messages from the SIP GW via a PPP over UDP-IP trunk between the mobile device and the SIP GW.

33. The method of claim 31, further wherein:

receiving a unique identifier comprises receiving a stream ID assignment for transmitting messages to and receiving messages from the SIP GW via a PPP over GRE-UDP-IP trunk between the mobile device and the SIP GW.

* * * * *